United States Patent [19]
Aoyagi

[11] Patent Number: 4,988,404
[45] Date of Patent: Jan. 29, 1991

[54] METHOD OF PRODUCING A PRIMARY DIFFRACTION GRATING

[75] Inventor: Toshitaka Aoyagi, Itami, Japan

[73] Assignee: Mitsubishi Denki Kabushiki Kaisha, Japan

[21] Appl. No.: 421,773

[22] Filed: Oct. 16, 1989

[30] Foreign Application Priority Data

Oct. 17, 1988 [JP] Japan .................... 63-261872

[51] Int. Cl.$^5$ .................. B44C 1/22; C03C 15/00; C03C 25/06
[52] U.S. Cl. .................... 156/651; 156/654; 156/661.1
[58] Field of Search ............ 156/650, 651, 654, 661.1, 156/662, 663; 350/162.16, 162.17, 162.18, 162.19, 162.2, 162.21, 162.22, 162.23, 162.24

[56] References Cited
PUBLICATIONS

S. M. Sze, Semiconductor Devices, Physics and Technology, 9.2.2, Silicon Nitride, 1985, pp. 360–362.
Hirata et al, "AlGaAs/GaAs DFB Lasers . . . Grating", 18P-ZR-14, p. 744.

Primary Examiner—William A. Powell
Attorney, Agent, or Firm—Leydig, Voit & Mayer

[57] ABSTRACT

A method of producing a primary diffraction grating includes depositing a resist pattern for producing a secondary diffraction grating on a substrate and thereafter etching the substrate using the resist as a mask, thereby producing a secondary diffraction grating, depositing a second mask material on the substrate and on the remaining resist, and subsequently removing the resist, and etching the exposed surface of the substrate using the second mask material as a mask, thereby to produce a primary diffraction grating. Therefore, there arises no waviness in the pattern end of the second resist mask pattern and a high quality primary diffraction grating can be produced.

2 Claims, 4 Drawing Sheets

METOD OF PRODUCING A PRIMARY DIFFRACTION GRATING

FIELD OF THE INVENTION

The present invention relates to a method of producing a primary diffraction grating, and more particularly, to a method for producing a high quality primary diffraction grating.

BACKGROUND OF THE INVENTION

FIGS. 3(a) to 3(g) show cross-sectional views for explaining a method of producing a primary diffraction grating according to the prior art which is disclosed in Opto-electronics session of 1987 Autoumn Meeting of Japanese Association of Applied Physics (Prescription No. 3 18P-ZR-14). FIGS. 4(a) and 4(b) are a plan view and a side view, respectively, showing resist patterning in the production process of the grating. In these figures, reference numeral 1 designates a substrate. Resist 2a is deposited on the substrate 1. A second time resist 2b is deposited on the substrate 1 after a secondary diffraction grating is produced thereon by etching using the first resist 2a as mask. Reference numerals 3a and 3b represent the periods of the secondary diffraction grating and the primary diffraction grating, respectively. Reference numeral 4 designates a sloped surface of the secondary diffraction grating produced by the first etching and reference numeral 5 designates an edge of the second resist mask pattern 2b.

The production process will be described.

First of all, a mask pattern of secondary diffraction grating comprising resist 2a deposited on the substrate 1 (FIG. 3(a)). The substrate 1 is etched using the resist 2a as a mask thereby to produce a secondary diffraction grating (FIG. 3(b)). Next, the resist 2a is removed (FIG. 3(c)) and second resist 2b is deposited covering the entire surface of the secondary diffraction grating (FIG. 3(d)). Next baking and development are carried out without light exposure thereby exposing convex portions of the secondary diffraction grating (FIG. 3(e)). Next, the substrate 1 is again etched from the exposed convex portions thereby to produce etched sloped surfaces, whereby a primary diffraction grating is produced (FIG. 3(e)). At last, the second resist 2b is removed (FIG. 3(g)).

Herein, the period 3b of the primary diffraction grating is one half of the period 3a of the secondary diffraction grating.

In this prior art method of producing a primary diffraction grating, the etched sloped surfaces 4 which are produced by the first etching in FIG. 3b) are likely to be concavo-convex reflecting the non-uniformity of the adhesion force of the resist 2a to the substrate 1. That is, at a position where the adhesion force of the resist 2a is strong, the etching depth is likely to be shallow and at a position where the adhesion force is weak, the etching depth is lilkely to be deep. Furthermore, the thickness of the second resist 2b which is deposited on the secondary diffraction grating is likely to be non-uniform reflecting the concavo-convex surfaces. Accordingly, when the convex portions are exposed as shown in FIG. 3(e), there is likely to be waviness at the pattern end 5 of the second resist mask 2b as shown in FIG. 4(a), and the primary diffraction grating which is produced utilizing the second resist mask pattern 2b having wavy end 5 is also likely to be irregular.

SUMMARY OF THE INVENTION

It is an object of the present invention to provide a method of producing a primary diffraction lattice for easily obtaining a high quality primary diffraction lattice.

Other objects and advantages of the present invention will become apparent from the detailed description given hereinafter; it should be understood, however, that the detailed description and specific embodiment are given by way of illustration only, since various changes and modifications within the spirit and the scope of the invention will become apparent to those skilled in the art from this detailed description.

According to the present invention, a pattern for producing a secondary diffraction grating is a resist, and a secondary diffraction grating is produced by etching using this resist pattern. Thereafter, a second mask material is deposited on the substrate and on the remaining resist on the substrate, and subsequently removing the resist and overlying second mask material. The exposed surface of substrate is etched using this second mask resist pattern thereby to produce a primary diffraction grating. Thus, the pattern of second mask material is produced utilizing the resists which are used for the production of secondary diffraction grating and the primary diffraction grating is produced using this second mask resist pattern. Therefore, there arises no waviness in the pattern end of the second resist mask pattern and a high quality primary diffraction grating can be produced.

DETAILED DESCRIPTION OF THE PREFERRED EMBODIMENT

An embodiment of the present invention will be described in detail with reference to the drawings.

Figure 1A:
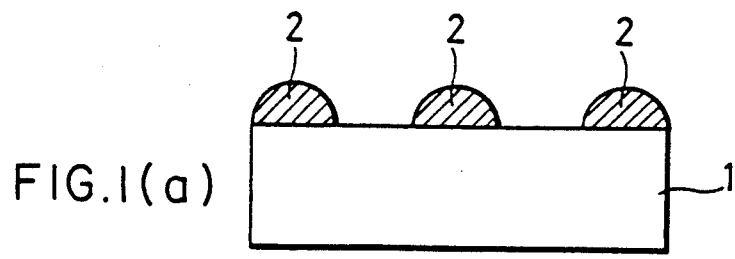
FIGS. 1(a) to 1(f) are sectional views showing process steps for producing a primary diffraction grating according to an embodiment of the present invention.
Figure 1B:
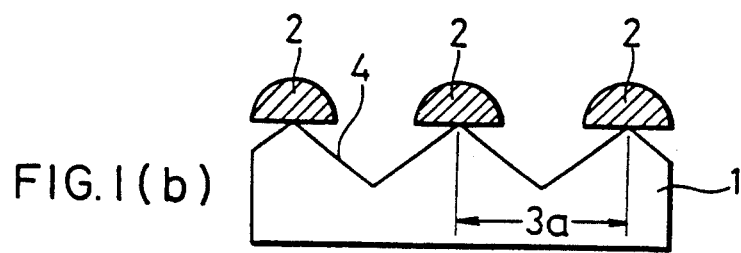
Figure 1C:
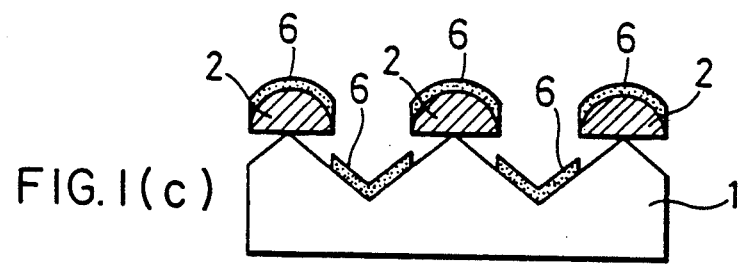
Figure 1D:
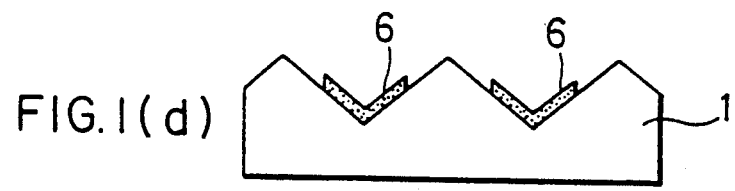
Figure 1E:
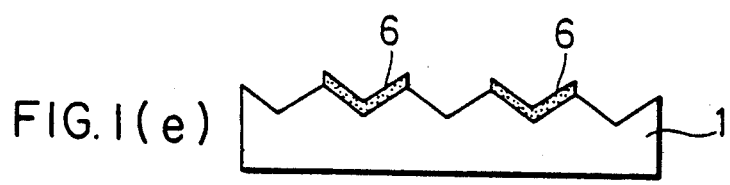
Figure 1F:
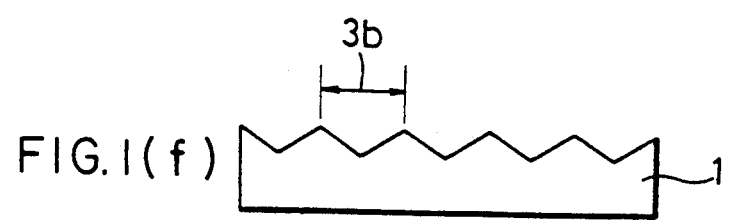
Figure 2A:
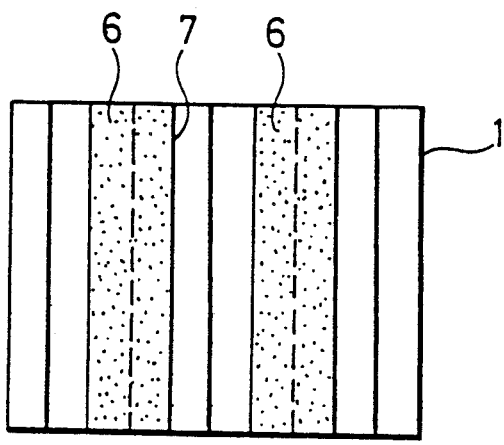
FIGS. 2(a) and 2(b) are plan ands sectional views showing patterning of the second mask material shown in FIG. 1.
Figure 2B:
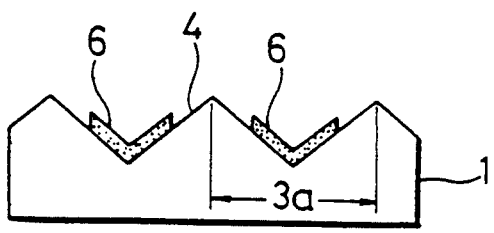

FIGS. 1(a) to 1(f) show cross-sectional views for explaining a method of producing a primary diffraction grating according to an embodiment of the present invention and FIGS. 2(a) and (b) show a plan view and a side view, respectively, of the second mask material patterned in the production method. In these figures, the same reference numerals designate the same or corresponding elements as those shown in FIGS. 3(a) to 3(g). Reference numeral 2 designates resists and reference numeral 7 designates an end of mask pattern of the second mask material 6.

The production method according to the present invention will be described.

Figure 3A:
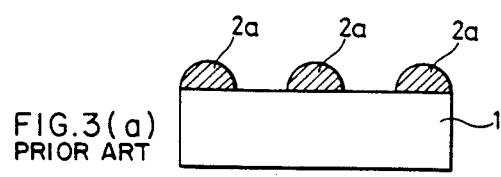
FIG. 3(a) to 3(g) are sectional view showing production process steps for producing a primary diffraction grating according to the prior art.
Figure 3B:
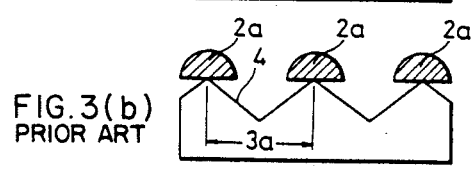
Figure 3C:
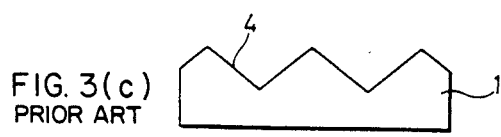
Figure 3D:
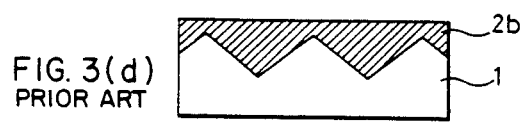
Figure 3E:
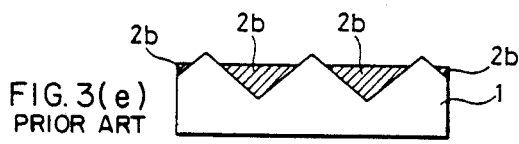
Figure 3F:
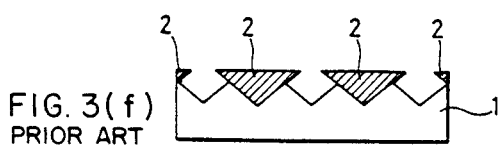
Figure 3G:
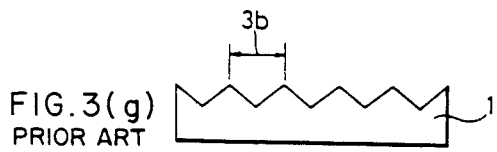
Figure 4A:
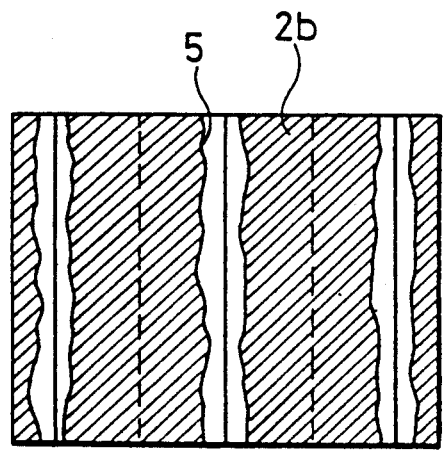
FIGS. 4(a) and 4(g) are plan and sectional views of the second time resist shown in FIG. 3.
Figure 4B:
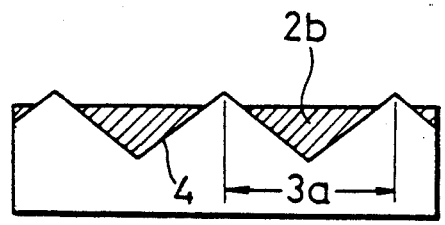

The processes up to the production of the secondary diffraction grating (FIGS. 1(a) and 1(b) are the same as those in the prior art method (shown in FIGS. 3(a) and 3(b)). In the present invention, subsequently thereto, a second mask material 6 such as silicon nitride is deposited on the substrate 1 and on the remaining resist 2

(FIG. 1(c)). Thereafter, the resist 2 is removed (lifted-off) for the first time (FIG. 1(d)). Next, the substrate 1 is etched from the exposed convex portions using the patterned second mask material 6 as a mask, thereby producing a primary diffraction grating (FIG. 1(e)). Lastly, the second mask material 6 is removed (FIG. 1(f)).

In the present invention, second mask material 6 is deposited on the surface through gaps between the masks comprising the resist 2 for producing the secondary diffraction grating, and thereafter, unrequired deposited material is removed together with the resist 2 as shown in FIG. 1(c). Accordingly, even if a the second resist, is deposited onto the exposed sloped surfaces 4 having concavo-convex portions, the mask pattern end 7 of the second mask pattern 6 remains straight as shown in FIG. 2(a), in contrast to the prior art method. As a result of that, the period 3b of the primary diffraction grating which is produced by etching utilizing the second mask material 6 as a mask can be made uniform over the entire surface.

While in the above-described embodiment a primary diffraction grating is produced on a substrate, the primary diffraction grating of the present invention may be produced on any material which requires production of primary diffraction grating.

As is evident from the foregoing description, according to the present invention, a second resist mask pattern is produced utilizing resist which are used as masks for producing a secondary diffracton grating. Therefore, there arises no waviness in the pattern end of the second resist mask pattern and a high quality primary diffraction grating can be produced.

What is claimed is:

1. A method of producing a primary diffraction grating comprising:
    forming a resist pattern for producing a second diffraction grating on a substrate;
    etching said substrate using said resist pattern as a mask, thereby producing a secondary diffraction grating;
    depositing a second mask material on said substrate and on the resist remaining on said substrate;
    removing said resist and the second mask material that overlies said resist; and
    etching the exposed surface of said substrate using said second mask material on said substrate as a mask, thereby producing a primary diffraction grating.

2. A method of producing a primary diffraction grating as defined in claim 1 wherein said second mask material comprises silicon nitride.

* * * * *

UNITED STATES PATENT AND TRADEMARK OFFICE
CERTIFICATE OF CORRECTION

PATENT NO. : 4,988,404

DATED : January 29, 1991

INVENTOR(S) : Toshitaka Aoyagi

It is certified that error appears in the above-identified patent and that said Letters Patent is hereby corrected as shown below:

Column 4, line 11, change "second" to --secondary--.

Signed and Sealed this

Twenty-fifth Day of August, 1992

Attest:

DOUGLAS B. COMER

Attesting Officer

Acting Commissioner of Patents and Trademarks